May 30, 1933.  W. A. ANDERSON  1,912,168
BOOKKEEPING MACHINE
Filed Jan. 10, 1930
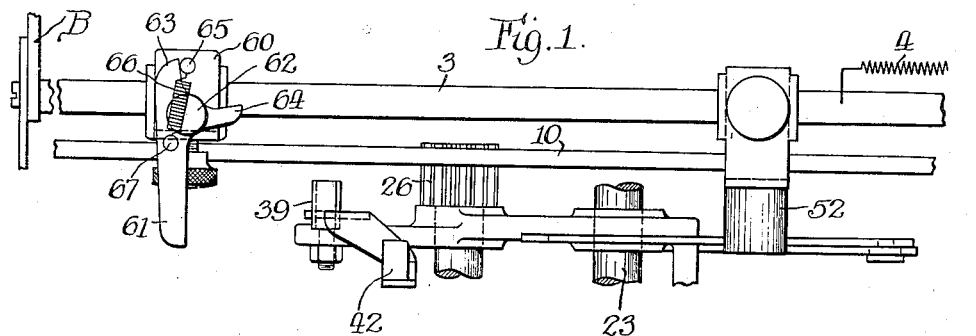
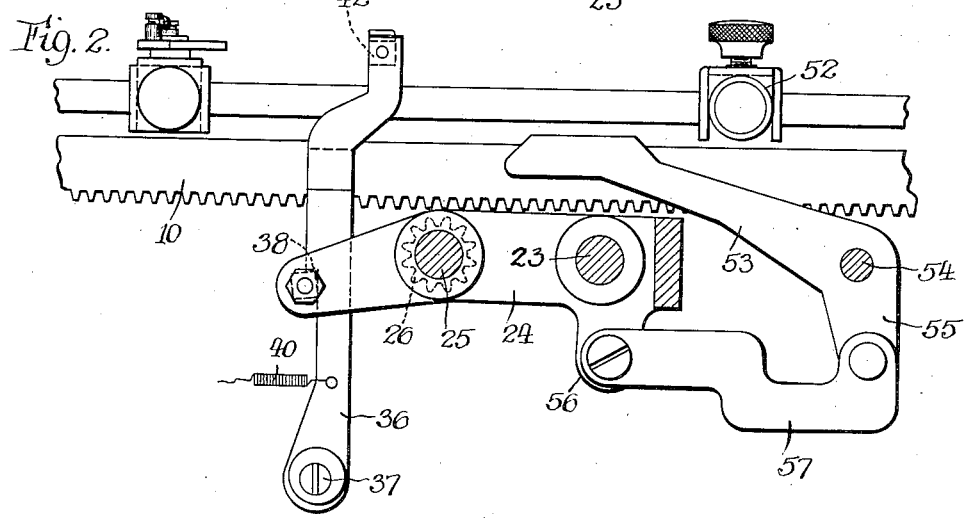
Inventor:
Walter A. Anderson Patented May 30, 1933

1,912,168

UNITED STATES PATENT OFFICE

WALTER A. ANDERSON, OF ROCKFORD, ILLINOIS, ASSIGNOR TO SUNDSTRAND CORPORATION, OF WILMINGTON, DELAWARE, A CORPORATION OF DELAWARE

BOOKKEEPING MACHINE

Application filed January 10, 1930. Serial No. 419,804.

This invention relates to bookkeeping machines, that is to say, to computing machines having a cross-tabulating carriage for effecting registration, printing and totaltaking in several columnar positions. It is customary in bank bookkeeping to add up the depositors' old balances and new balances periodically, say, once a day or once a week, in order to prove the accuracy with which the bookkeeping has been done. The addition of the old and the new balances for proof purposes could be done upon a machine having a shuttle carriage, that is to say, a carriage which reciprocates regularly between two positions so as to produce two parallel columns of figures, one of which may consist of the new balances and the other the old balances. It is desirable, however, to be able to do such old and new balance proof work upon a bookkeeping machine in order to obviate the necessity of providing a shuttle-carriage machine for such work. The present invention, therefore, relates to means whereby a cross-tabulating carriage of a bookkeeping machine may be caused to "shuttle" or reciprocate between two columnar positions.

In the accompanying drawing:

Figure 1 is a fragmental plan view of a carriage return mechanism embodying the features of my invention.

Fig. 2 is a fragmental rear side view of said mechanism.

Fig. 3 is a facsimile of the work produced by the machine.

While the invention may be embodied in machines of various constructions, I have herein shown the invention as embodied in a mechanism similar to that fully disclosed in application Serial No. 278,950, filed May 19, 1928 by Oscar J. Sundstrand. Said application illustrates and describes a computing machine which is provided with a laterally movable paper carriage B. The carriage comprises a longitudinally extending bar 3 on which are mounted dogs or stops for starting and stopping return movements of the carriage. Means of any wellknown or preferred character, as, for example, a spring, is employed to move the carriage in its working stroke, that is to say, from right to left of the operator. As viewed in Figs. 1 and 2 of the present application, the working stroke is from left to right. A spring to impart the working stroke is indicated diagrammatically at 4.

The means for returning the carriage to its initial position against the tension of the before-mentioned carriage-moving spring comprises a rack bar 10. A shaft 23 is journaled in the framework of the machine. Pivoted upon this shaft is a frame 24. On a shaft 25 journaled in said frame is fixed a pinion 26 arranged to mesh with the rack bar 10. Means of any preferred character, as, for example, that fully disclosed in said application Serial No. 278,950, may be used to drive the shaft 25.

Means is provided for swinging the frame 24 to place the pinion 26 in mesh with the rack bar 10, which means may be like that disclosed in said application Serial No. 278,-950, or of any other desired nature. Normally the frame 24 is held with the pinion 26 out of mesh with the rack bar by means of a latch lever 36 which is pivoted at 37, said lever having a locking shoulder 38 adapted to be engaged by a projection 39 on the frame 24. A spring 40 normally holds the latch lever 36 in engagement with the projection 39. When the paper carriage B reaches the end of its leftward or working stroke, a stop or dog (not shown) adjustably mounted on the bar 3 engages a projection 42 on the upper end of the latch lever 36 and swings said lever to the right, as viewed in the present drawing, thereby disengaging the locking shoulder 38 from the projection 39, whereupon the frame 24 is tilted to place the pinion 26 in mesh with the rack.

The means for disengaging the pinion 26 from the rack when the carriage has been returned to the desired point includes a stop or roller 52 adjustably mounted upon the bar 3. A cam lever 53 pivotally mounted at 54 has a downwardly extending arm 55 which is connected to a downwardly extending portion 56 of the frame 24 by means of a link 57. When the frame 24 is tilted to place the pinion 26 in mesh with the rack, the free end of the cam lever 53 is raised into position to be engaged by the roller 52 as the paper carriage returns to its initial position. Depression of the cam lever 53 by the roller 52 causes the frame 24 to be swung downwardly, thereby withdrawing the pinion 26 from the rack. As soon as the frame 24 is thus depressed, the latch lever 36 is moved by the spring 40 into latching engagement with the projection 39.

In order that the cross-tabulating carriage B may be reciprocated through a relatively short path, as required in listing and adding the old and new balances for proof purposes as hereinbefore referred to, there is mounted upon the bar 3 a special stop which is adapted to engage the stud 42 and which may be moved into inoperative position when the carriage B is to have its normal cross-tabulating movements. This special stop comprises a body 60 adjustably mounted on the bar 3. A stop or rearwardly extending dog 61 is pivoted on the body 60 at 62, said dog being of sufficient length to engage the stud 42 as the carriage moves toward the right, as viewed in the present drawing. The dog 61 has two lugs 63 and 64 adapted to engage a pin 65 on the body 60. A contractile spring 66 is anchored to the dog 61 at 67. The point 67 is so located with reference to the axis 62 that the spring 66 will hold the dog 61 in adjusted position with the lug 63 in engagement with the pin 65 or with the lug 64 in engagement with said pin. When the lug 63 is held against the pin 65, the dog 61 is in operative position. When the operator swings the dog 61 in the direction to place the lug 64 against the pin 65, the spring 66 holds said lug 64 against the pin 65, the dog 61 being then out of position to engage the projection 42.

When the machine is being used for posting purposes, the dog 61 is placed in its inoperative position. When it is desired to list the old and new balances, the dog 61 is swung into its operative position and the carriage provided with tape on which the old and new balances may be listed and the difference ascertained.

In Fig. 3, the left-hand column may be assumed to be a list of new balances and the right-hand column a list of old balances. The total at the foot of the left-hand column is the difference between the total new balances and the total old balances, and thus indicates the amount of increase in deposits.

It will be seen that the present invention permits of doing shuttle-carriage work on a bookkeeping machine.

I claim as my invention:

In a bookkeeping machine, the combination of a laterally movable carriage, a rack bar movable with said carriage, and carriage return mechanism including a lever pivoted for movement toward and away from said rack bar, a pinion journaled on said lever for movement into and out of mesh with said rack bar, a detent normally restraining said lever to prevent movement of said pinion into engagement with said rack bar, a dog on the carriage pivoted for movement into and out of position to disable said detent, a second lever effective to move said pinion out of engagement with said rack bar, and a roller on said carriage to operate said second mentioned lever.

In testimony whereof, I have hereunto affixed my signature.

WALTER A. ANDERSON.